United States Patent
Yonezu

(10) Patent No.: US 11,117,050 B2
(45) Date of Patent: Sep. 14, 2021

(54) INFORMATION PROCESSING PROGRAM

(71) Applicant: NINTENDO CO., LTD., Kyoto (JP)

(72) Inventor: Makoto Yonezu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 20 days.

(21) Appl. No.: 16/867,830

(22) Filed: May 6, 2020

(65) Prior Publication Data

US 2020/0353354 A1  Nov. 12, 2020

(30) Foreign Application Priority Data

May 8, 2019 (JP) .............................. JP2019-088472
Mar. 3, 2020 (JP) .............................. JP2020-035866

(51) Int. Cl.
    *A63F 13/20* (2014.01)
    *A63F 13/358* (2014.01)
    *A63F 13/52* (2014.01)
    *A63F 13/56* (2014.01)

(52) U.S. Cl.
    CPC ............ *A63F 13/358* (2014.09); *A63F 13/52* (2014.09); *A63F 13/56* (2014.09)

(58) Field of Classification Search
    CPC .......... A63F 13/20; A63F 13/22; A63F 13/23; A63F 13/25; A63F 13/40; A63F 13/44; A63F 13/45; A63F 13/50; A63F 13/52; A63F 13/525; A63F 13/5255; A63F 13/5258; A63F 13/533; A63F 13/537; A63F 13/55; A63F 2300/30; A63F 2300/6661; A63F 2300/6669; A63F 2300/6684

See application file for complete search history.

(56) References Cited

U.S. PATENT DOCUMENTS

2019/0240579 A1*  8/2019  Drouin .................... A63F 13/48

OTHER PUBLICATIONS

[Online] Nintendo Co., Ltd., https://www.nintendo.co.jp/wiiu/amaj/guide/page_06.html, Apr. 10, 2019, with English Translation, 10 pages.

* cited by examiner

*Primary Examiner* — Omkar A Deodhar
(74) *Attorney, Agent, or Firm* — Nixon & Vanderhye PC

(57) ABSTRACT

A non-transitory storage medium according to the present disclosure is a storage medium storing therein a program that is readable by a computer of an information processing apparatus, the program that is configured to cause the computer to function as: a first object display unit configured to display a player object in a first display mode in a first game space; a first object control unit configured to perform three-dimensional control for causing the player object displayed in the first display mode to perform three-dimensional movement in the first game space based on an operation performed by a user; an option generation unit configured to generate an image for allowing the user to, from among options respectively corresponding to a plurality of second game spaces, select one of the second game spaces as a selected game space.

12 Claims, 13 Drawing Sheets

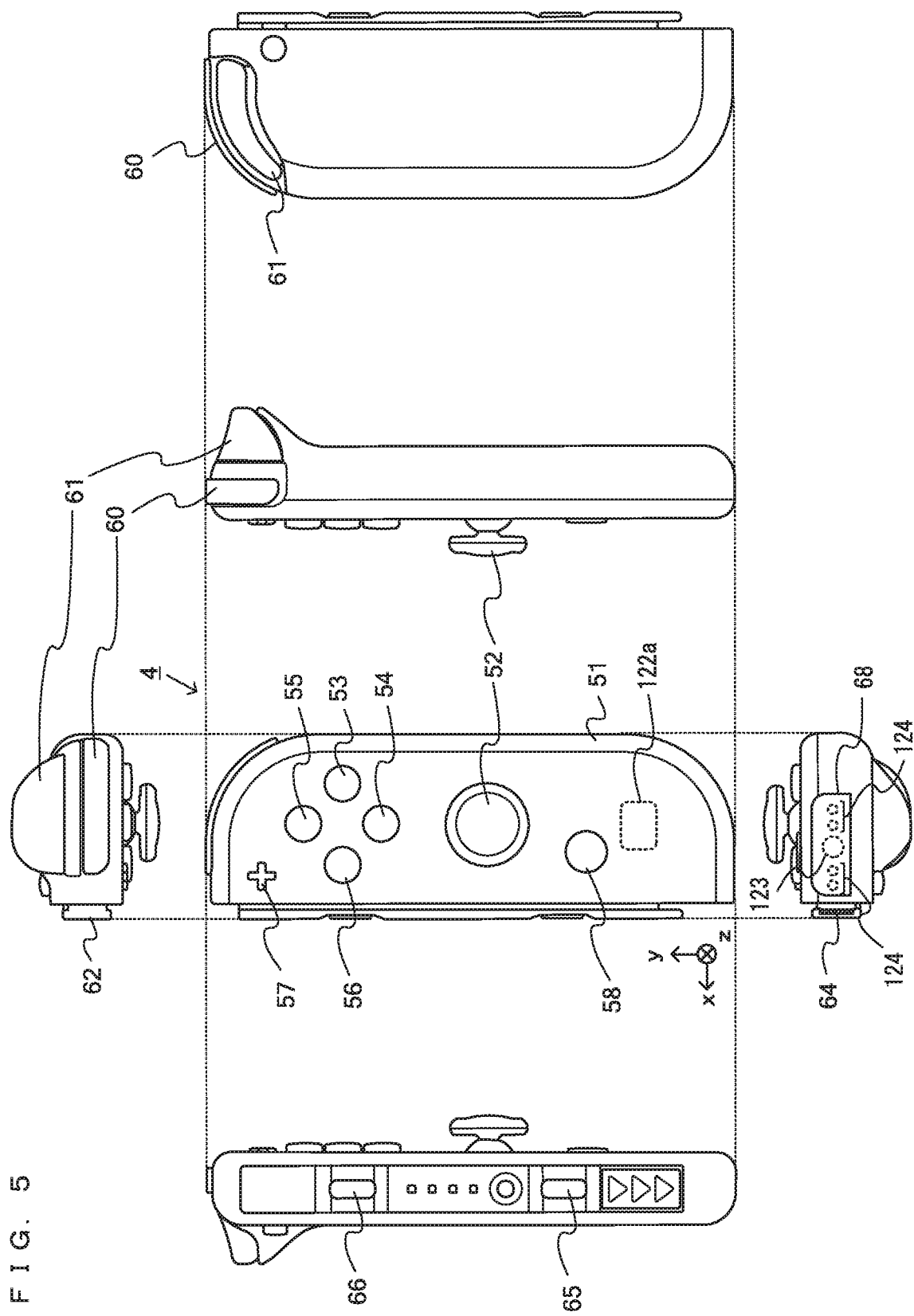
F I G. 5

INFORMATION PROCESSING PROGRAM

This application claims priority to JP Patent Application No. 2019-088472 filed May 8, 2019 and JP Patent Application No. 2020-035866 filed Mar. 3, 2020, the entire contents of each of which are hereby incorporated by reference.

TECHNICAL FIELD

The present invention relates to a storage medium, an information processing apparatus, and an information processing method.

BACKGROUND ART

With the game indicated in Non-Patent Document 1, if a user selects a course from among multiple game courses (game spaces) set in advance, when the selected course is played, the form of a character of a player changes according to the type of the course, and thus game characteristics are improved.

Non-Patent Document 1: Nintendo Corporation, [online], [searched for on Apr. 10, 2019], Internet, https://www.nintendo.co.jp/wiiu/amaj/guide/page_06.html

SUMMARY OF THE INVENTION

However, in this game, after a course was selected, the user had no choice but to wait while the data for that course was loaded to the memory. The present invention was made in order to solve this problem, and aims to provide a storage medium, an information processing apparatus, and an information processing method according to which it is possible to reduce the load time experienced by a user when switching courses.

A storage medium according to the present disclosure is a non-transitory storage medium storing therein a program that is readable by a computer of an information processing apparatus, the program being configured to cause the computer to function as: a first object display unit configured to display a player object in a first display mode in a first game space; a first object control unit configured to perform three-dimensional control for causing the player object displayed in the first display mode to perform three-dimensional movement in the first game space based on an operation performed by a user; an option generation unit configured to generate an image for allowing the user to, from among options respectively corresponding to a plurality of second game spaces, select one of the second game spaces as a selected game space; a type determination unit configured to determine a game space type based on the selected game space, game space types being respectively set for the plurality of second game spaces; a mode changing unit configured to change the player object displayed in the first display mode to the player object displayed in a second display mode corresponding to the determined game space type in the first game space after determination of the game space type; a loading unit configured to load data for the selected game space to a memory of the information processing apparatus; a second object display unit configured to display the player object in a third display mode relating to the second display mode in the selected game space after loading of the data for the selected game space is complete; and a second object control unit configured to perform two-dimensional control for causing the player object displayed in the third display mode to perform two-dimensional movement in the selected game space based on an operation performed by the user.

According to this configuration, when a transition is to be made from a first game space for performing three-dimensional control on a player object to a second game space for performing two-dimensional control on the player object, the player object is changed to a second display mode in the first game space according to the game space type of the selected second game space, and thereafter the object is displayed in a third display mode in the second game space. Here, since the second display mode is related to the third display mode, when a transition is to be made from the first game space to the second game space, it is possible to reduce a user's feeling that something is wrong when the object suddenly changes to the third display mode for two-dimensional control.

Also, the data for the selected game space can be loaded using the period of time from when the player object changes from the first display mode to the second display mode, to when the selected game space is displayed and two-dimensional control is started thereafter. That is, in the period up to when a transition is made from the first game space to the second game space, a period of time is provided in which the user is shown the change in the display mode of the player object, and therefore it is possible to reduce the amount of time during which the user experiences the loading of the data.

In the above-described storage medium, the second object control unit can allow operation of the player object using an operation method different from that of the first object control unit.

If the method for operating the player object in the first game space and the method for operating the player object in the second game space are different from each other as in this configuration, there is a possibility that the user will feel that something is wrong, but by showing a second display mode as described above, the user can prepare for the changing of the operation method when the second game space is transitioned to. As a result, it is possible to reduce errors in the operation method.

In the above-described storage medium, the second object control unit can allow operation of the player object using an operation input means different from that of the first object control unit.

The operation input means is, for example, an analog stick, a directional pad, buttons, or the like for operating the player object, and for example, the operation input means can be configured to be different, such that the first object control unit allows operation using an analog stick, whereas the second object control unit allows operation using the directional pad. Even in this case, the user can prepare for the operation input means to change when the second game space is transitioned to.

In the above-described storage medium, the second object control unit can allow operation of the player object using an operation method set for the game space type of the selected game space. In this case as well, the user can prepare for the operation method to change when the second game space is transitioned to.

In the above-described storage medium, the second object control unit can allow operation of the player object using an operation input means set for the game space type of the selected game space. In this case as well, the user can prepare for the operation input means to change when the second game space is transitioned to.

In the above-described information processing program, the mode changing unit can set various display modes as the second display mode, and for example, the mode changing unit can use a display mode in which the third display mode is expressed in three dimensions.

Alternatively, the mode changing unit can use, for example, the third display mode as the second display mode. Accordingly, since the third display mode displayed in the second game space is already displayed in the first game space, when the second display space is transitioned to, it is not necessary to load the player object in the third display mode again. Accordingly, it is possible to eliminate the time for loading the data for the player object in the third display mode.

In the above-described storage medium, the first object display unit can use a three-dimensional display mode as the first display mode. Accordingly, since the first display mode is suitable for three-dimensional control in the first game space, it is easier for the user to perform operation.

In the above-described storage medium, the second object display unit can display the player object in the third display mode in the selected game space expressing a two-dimensional space. Accordingly, since the second game space is suitable for two-dimensional control in the second game space, it is easier for the user to perform operation.

In the above-described storage medium, it is possible to further cause the computer to function as an emphasized image generation means for generating an image in which the player object is visually emphasized relative to another portion, after the player object displayed in the first display mode is changed to the player object displayed in the second display mode.

According to this configuration, it is possible to show the user, in a manner that is easier to understand, that the game space is transitioning.

In the above-described storage medium, if a condition for loading the first game space is satisfied when the two-dimensional control is being performed in the second game space, the loading unit can perform loading of the data for the first game space, and the mode changing unit can change the player object displayed in the third display mode to the player object displayed in the first display mode in the second game space before the three-dimensional control is started in the first game space.

A first information processing apparatus according to the present disclosure includes: at least one processor; at least one volatile memory; at least one storage medium; and a program stored in the storage medium; wherein the program is configured to cause the processor to: display a player object in a first display mode in a first game space displayed on the display unit; perform three-dimensional control for causing the player object displayed in the first display mode to perform three-dimensional movement in the first game space based on an operation performed by a user; generate an image for allowing the user to, from among options respectively corresponding to a plurality of second game spaces, select one of the second game spaces as a selected game space; determine a game space type based on the selected game space, game space types respectively being set for the plurality of second game spaces; change the player object displayed in the first display mode to the player object displayed in a second display mode corresponding to the determined game space type in the first game space after determination of the game space type; load data for the selected game space to the memory; display the player object in a third display mode relating to the second display mode in the selected game space displayed on the display unit after loading of the data for the selected game space is complete; and perform two-dimensional control for causing the player object displayed in the third display mode to perform two-dimensional movement in the selected game space based on an operation performed by the user.

A second information processing apparatus according to the present disclosure is an information processing apparatus to be connected to a display apparatus including a display unit, the information processing apparatus including: at least one volatile memory; at least one processor; at least one storage medium; and a program stored in the storage medium; wherein the program is configured to cause the processor to: display a player object in a first display mode in a first game space displayed on the display unit; perform three-dimensional control for causing the player object displayed in the first display mode to perform three-dimensional movement in the first game space based on an operation performed by a user; generate an image for allowing the user to, from among options respectively corresponding to a plurality of second game spaces, select one of the second game spaces as a selected game space; determine a game space type based on the selected game space, game space types being respectively set for the plurality of second game spaces; a mode changing unit configured to change the player object displayed in the first display mode to the player object displayed in a second display mode corresponding to the determined game space type in the first game space after determination of the game space type; load data for the selected game space to the memory; display the player object in a third display mode relating to the second display mode in the selected game space displayed on the display unit after loading of the data for the selected game space is complete; and perform two-dimensional control for causing the player object displayed in the third display mode to perform two-dimensional movement in the selected game space based on an operation performed by the user.

An information processing method according to the present disclosure is an information processing method to be executed by a computer of an information processing apparatus, the information processing method including: displaying a player object in a first display mode in a first game space; performing three-dimensional control for causing the player object displayed in the first display mode to perform three-dimensional movement in the first game space based on an operation performed by a user; generating an image for allowing the user to, from among options respectively corresponding to a plurality of second game spaces, select one of the second game spaces as a selected game space; determining a game space type based on the selected game space, game space types being respectively set for the plurality of second game spaces; changing the player object displayed in the first display mode to the player object displayed in a second display mode corresponding to the determined game space type in the first game space after determination of the game space type; loading data for the selected game space to a memory of the information processing apparatus; displaying the player object in a third display mode relating to the second display mode in the selected game space after loading of the data for the selected game space is complete; and performing two-dimensional control for causing the player object displayed in the third display mode to perform two-dimensional movement in the selected game space based on an operation performed by the user.

According to the above-described storage medium, information processing apparatus, and information processing method, it is possible to produce game characteristics for the user even during loading of the data when the type of the game space is switched.

BRIEF DESCRIPTION OF THE DRAWINGS

FIG. 5 is a six-surface diagram showing an example of the right controller of FIG. 1.

EMBODIMENTS OF THE INVENTION

Hereinafter, an embodiment in which an information processing apparatus according to the present invention is applied to a game system will be described.

1. Hardware Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

1-1. Main Body Apparatus

Figure 1:
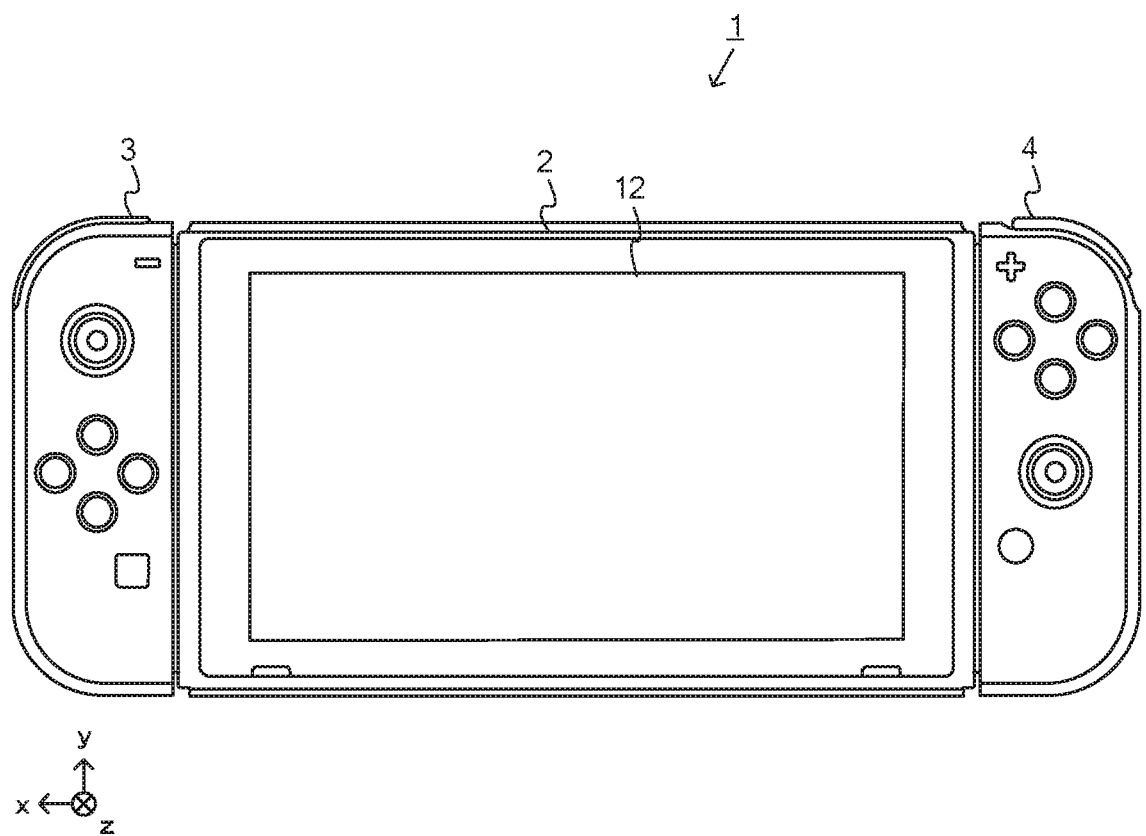
FIG. 1 is a diagram showing an example of a game system in a state in which a left controller and a right controller are mounted on a main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display (display unit) 12. Each of the left controller 3 and the right controller 4 is an apparatus including operation sections with which a user provides inputs.

Figure 2:
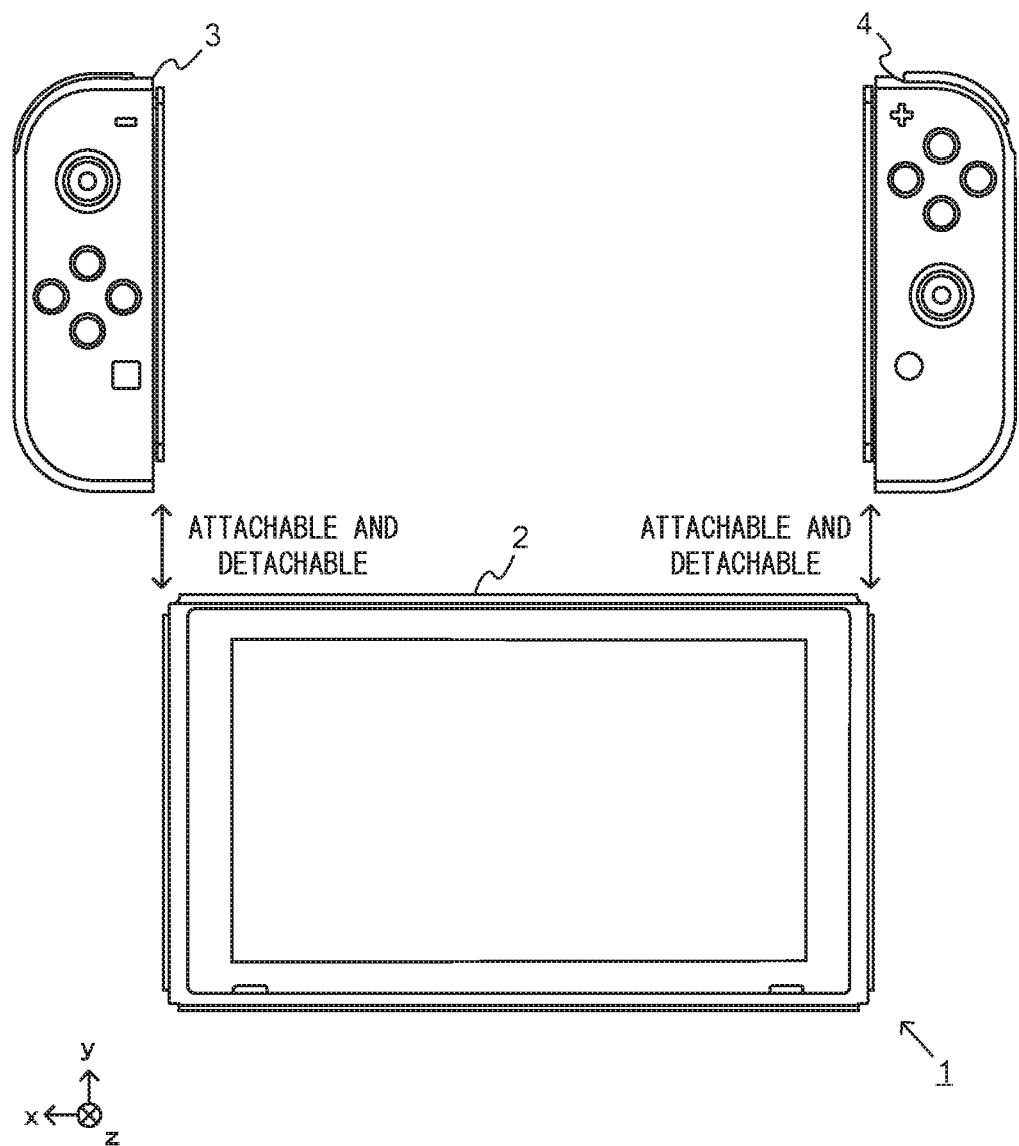
FIG. 2 is a diagram showing an example of a game system in a state in which the left controller and the right controller have been removed from the main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
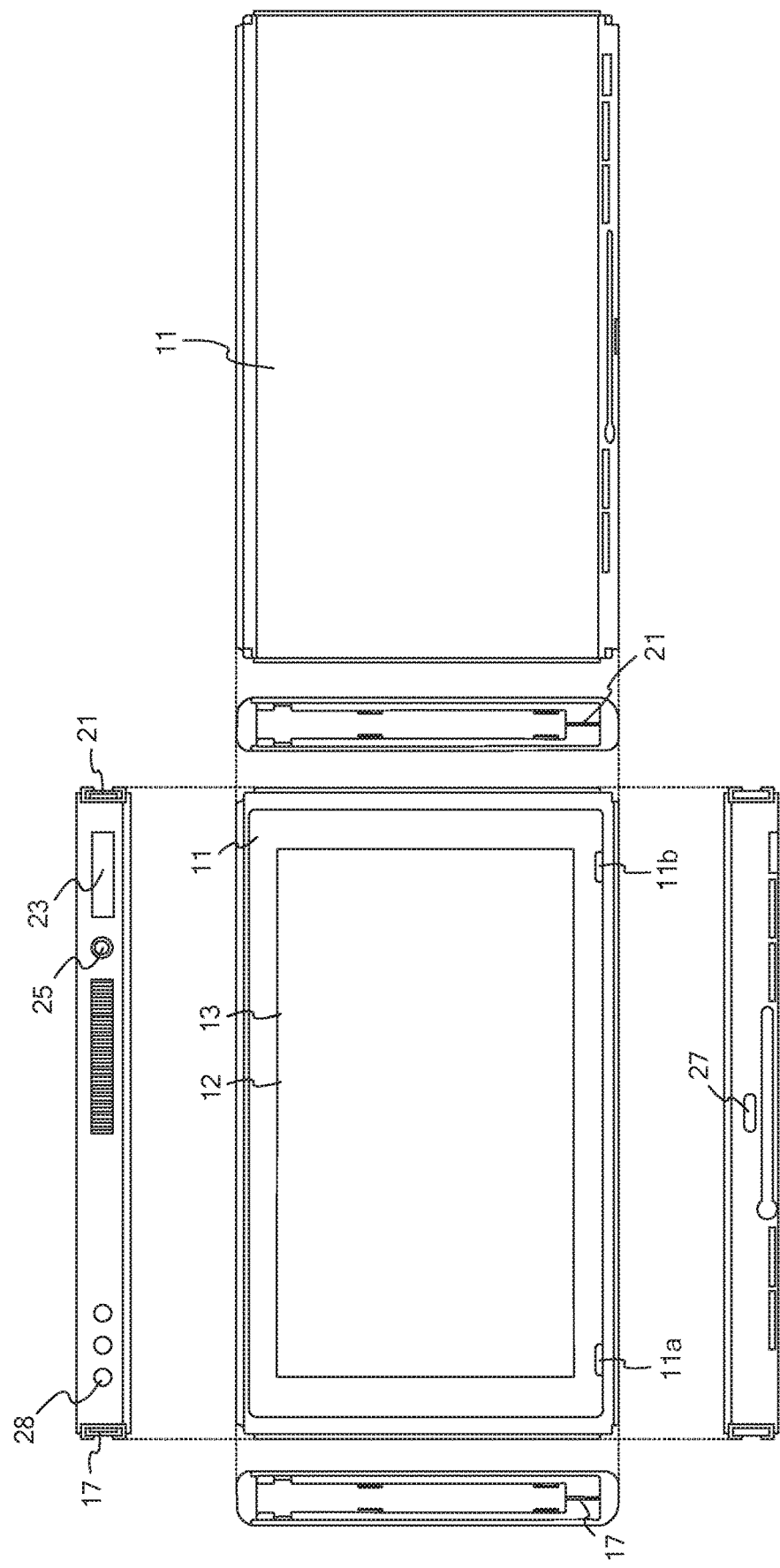
FIG. 3 is a six-surface diagram showing an example of the main body apparatus of FIG. 1.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

1-2. Left Controller

Figure 4:
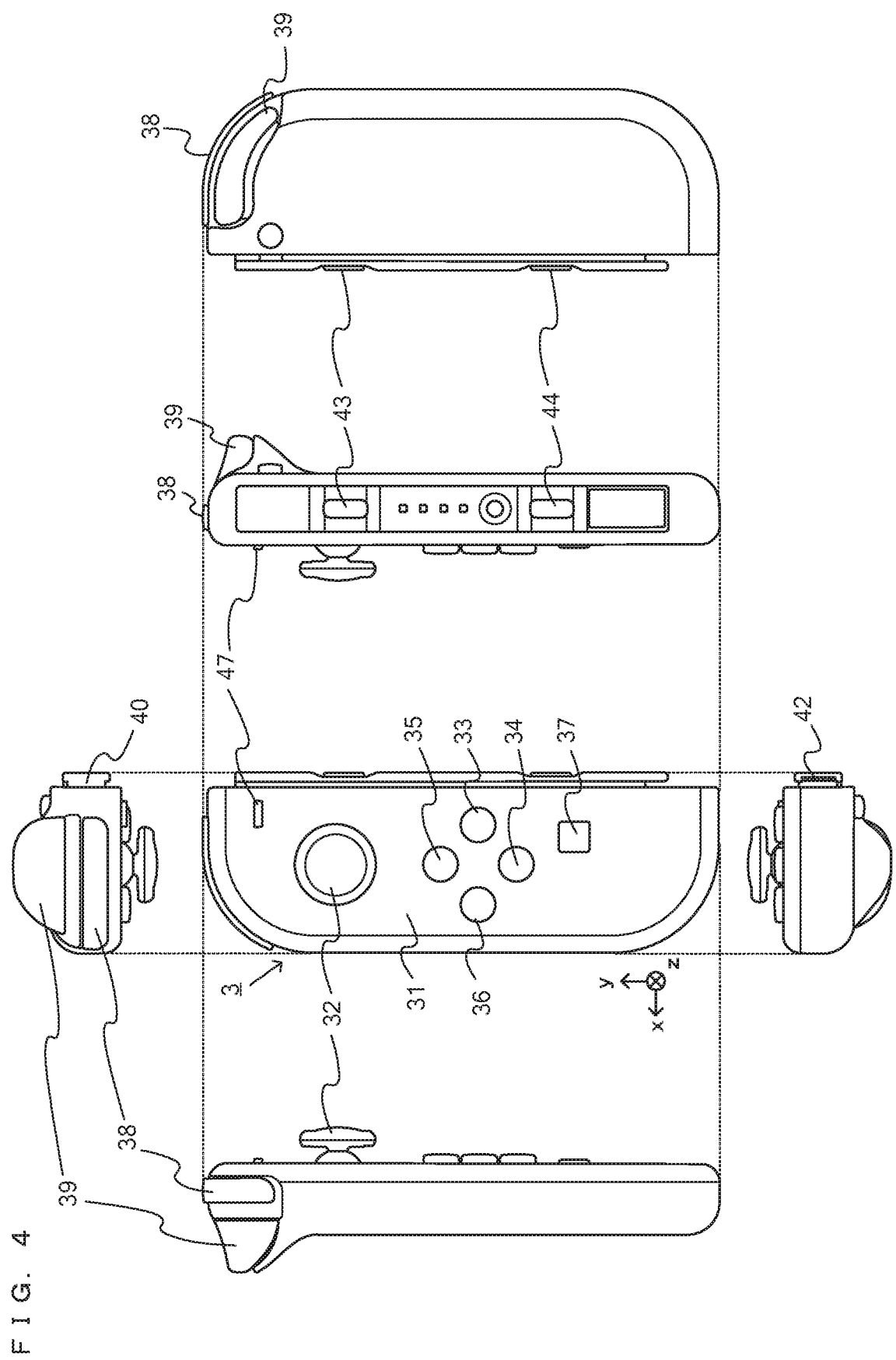
FIG. 4 is a six-surface diagram showing an example of the left controller of FIG. 1.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

1-3. Right Controller

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands. Here, for the sake of simplicity of the description, it is assumed that the outer surface of the housing 51 of the right controller 4 is defined as follows. That is, the housing 51 is formed into an overall cuboid shape and includes a rectangular first main surface whose longitudinal direction is the vertical direction, and a second main surface on the side opposite to the first main surface. Also, in the housing 51, the upper end surface in the longitudinal direction of these main surfaces forms a first end surface and the lower end surface forms a second end surface. Also, the right-side surface in the shorter direction of the two main surfaces forms a first side end surface, and the left-side surface forms a second side end surface. However, the left end portion of the first end surface has a flat surface that faces upward in the longitudinal direction, but the first end surface is formed so as to curve downward toward the right side and is joined to the upper end of the first side end surface. Also, as will be described later, a curved first R button 60 is arranged on the first end surface. Similarly, the left end portion of the second end surface has a flat surface that faces downward in the longitudinal direction, but the second end surface is formed so as to curve upward toward the right side and is joined to the lower end of the first side end surface. Also, an infrared image capture section 123 and an infrared light-emitting section 124, which will be described later, are arranged on the second end surface.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. The operation buttons 53 to 58 and the analog stick 32 provided on the first main surface of the right controller 4 are examples of first operation portions of the present invention. Also, the right controller 4 includes a curved first R button 60 on the first end surface of the housing 51. Also, a ZR button 61 that protrudes toward the rear surface and can be pressed from above is provided on the rear surface side of the first R button 60. Also, a protruding portion 500 is formed below the ZR button 61. The protruding portion 500 is a portion that bulges from the second main surface and has an inclined surface that is inclined toward the second main surface from the ZR button 61. Here, the first R button 60 is an example of a second operation portion of the present invention, and the ZR button 61 and the protruding portion 500 are examples of third operation portions. Further, similarly to the left controller 3, the right controller 4 includes a second L-button 65 and a second R-button 66.

Further, a window portion 68 is provided on a the second end surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 5) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 5) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Further, although the details will be described later, the right controller 4 includes an NFC communication section 122. The NFC communication section 122 performs short-range wireless communication based on the NFC (Near Field Communication) standard. The NFC communication section 122 includes an antenna 122*a*, which is used for short-range wireless communication, and a circuit (e.g., an NFC chip) for generating a signal (a radio wave) to be sent from the antenna 122*a*. It should be noted that the NFC communication section 122 may perform short-range wireless communication through any proximity communication (or contactless communication), instead of performing short-range wireless communication based on the NFC standard. Here, the NFC standard can be used for proximity communication (contactless communication), and "may perform short-range wireless communication through any proximity communication (or contactless communication)" is intended to mean that short-range wireless communication may be performed through other proximity communication except for proximity communication based on the NFC standard.

Further, the right controller 4 includes a terminal 64 for the right controller 4 to perform wired communication with the main body apparatus 2.

1-4. Internal Configuration of Main Body Apparatus

Figure 6:
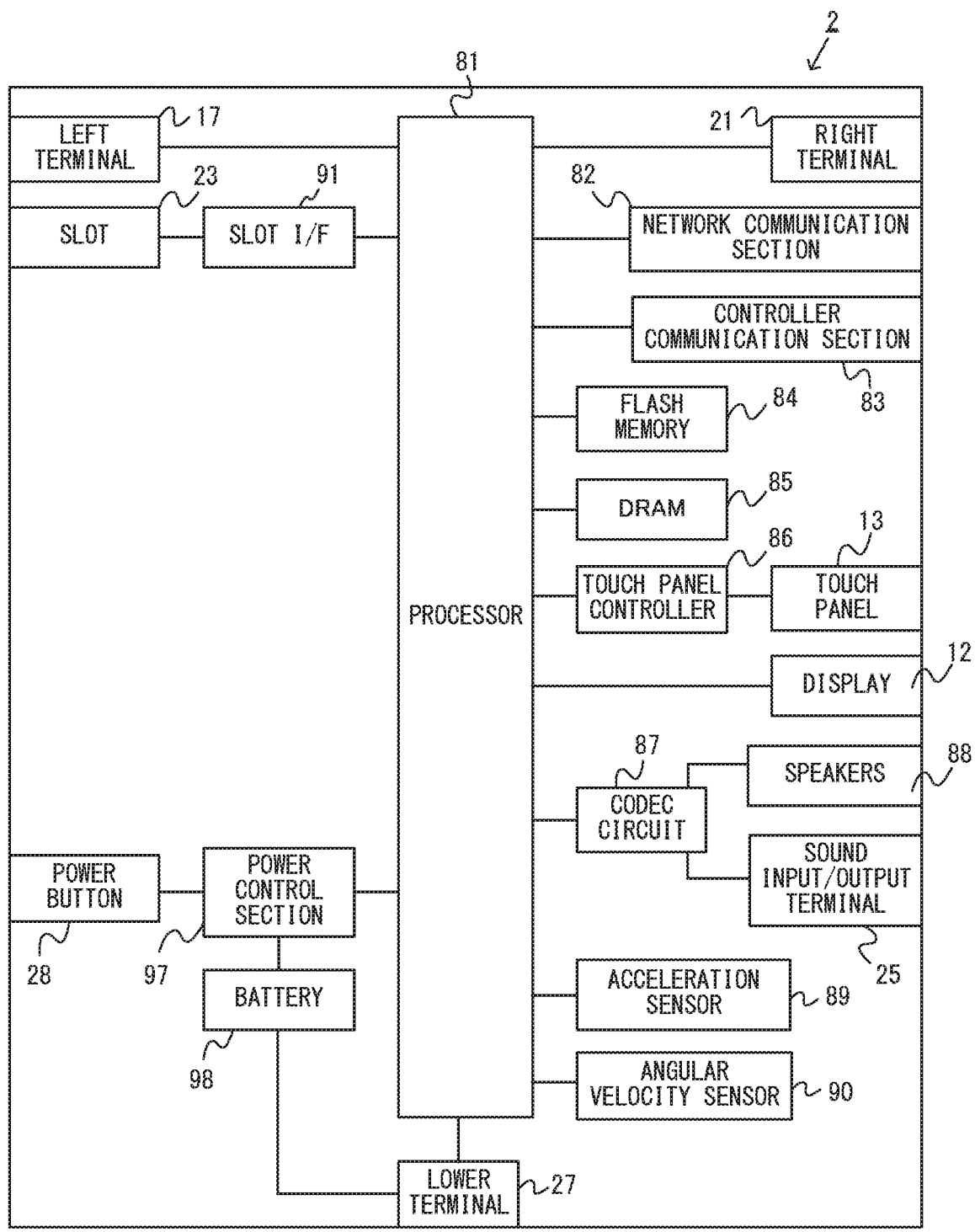
FIG. 6 is a block diagram showing an example of an internal configuration of the main body apparatus of FIG. 1.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

1-5. Internal Configuration of Controller

Figure 7:
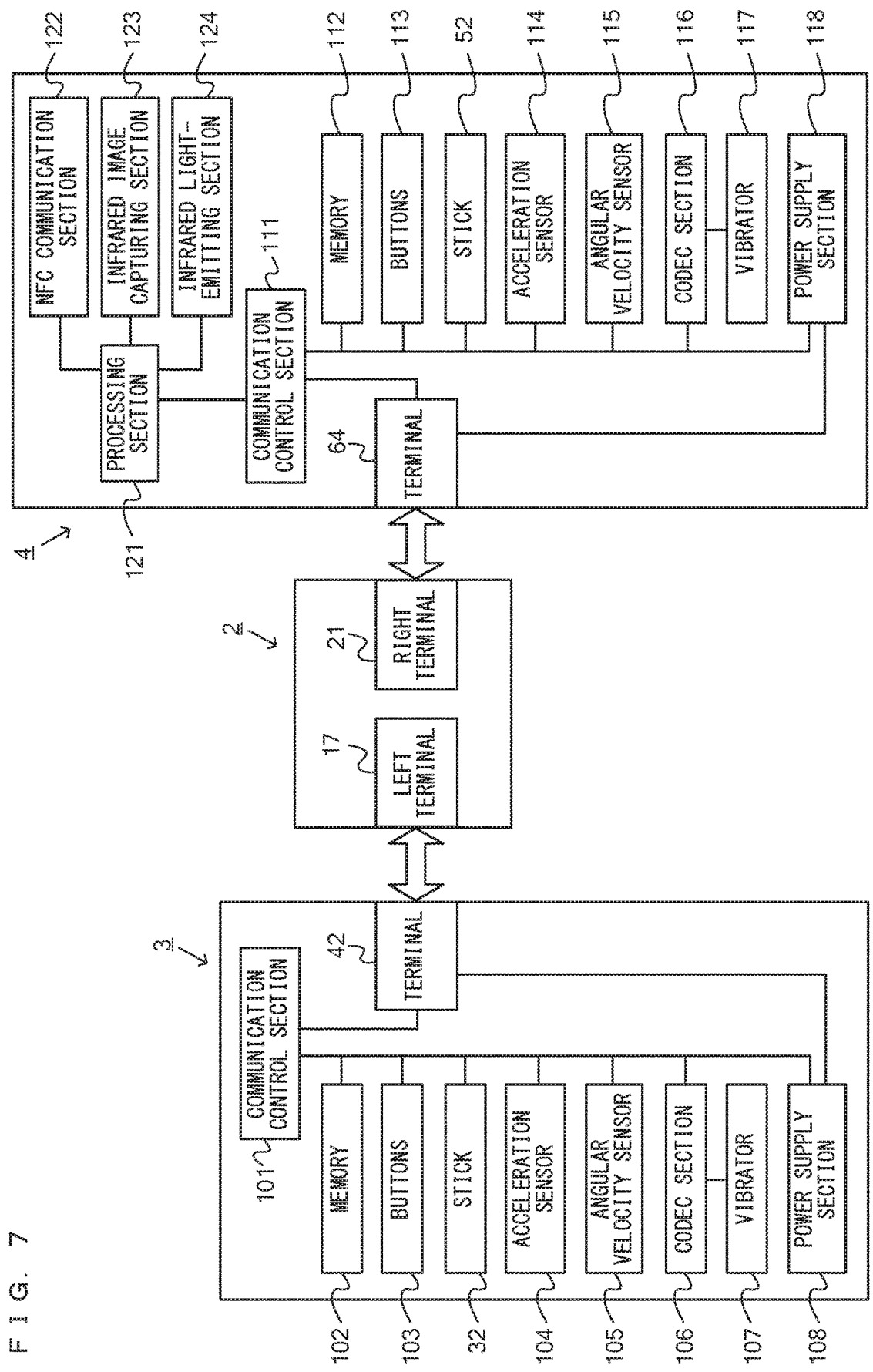
FIG. 7 is a block diagram showing an example of internal configurations of the main body apparatus, the left controller, and the right controller of FIG. 1.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes the NFC communication section 122, which performs short-range wireless communication based on the NFC standard. The NFC communication section 122 has the function of a so-called NFC reader/writer. Here, the term "short-range wireless communication" as used herein includes a communication method where a radio wave from an apparatus (here, the right controller 4) develops an electromotive force (e.g., by electromagnetic induction) in another device (here, a device near the antenna 122*a*). The other device can operate by the developed electromotive force, and may or may not have a power supply. When the right controller 4 (the antenna 122*a*) and a communication target come close to each other (typically, the distance between the right controller 4 and the communication target becomes dozen centimeters or less), the NFC communication section 122 becomes able to communicate with the communication target. The communication target is any apparatus capable of performing short-range wireless communication with the NFC communication section 122 and is, for example, an NFC tag or a storage medium having the function of an NFC tag. Alternatively, the communication target may be another apparatus having an NFC card emulation function.

Further, the right controller 4 includes the infrared image capturing section 123 on the second surface. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the NFC communication section 122, the infrared image capturing section 123, and the infrared light-emitting section 124. In accordance with a command from the main body apparatus 2, the processing section 121 performs the process of managing the NFC communication section 122. For example, in accordance with a command from the main body apparatus 2, the processing section 121 controls the operation of the NFC communication section 122. Further, the processing section 121 controls the start of the NFC communication section 122 or controls the operations (specifically, reading, writing, and the like) of the NFC communication section 122 performed on a communication target (e.g., an NFC tag). Further, the processing section 121 receives, from the main body apparatus 2, information to be transmitted to the communication target via the communication control section 111 and passes the information to the NFC communication section 122. Further, the processing section 121 acquires, from the NFC communication section 122, information received from the communication target and transmits the information to the main body apparatus 2 via the communication control section 111.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

2. Overview of Game

Next, an overview of a game that is performed in the game system of the present embodiment will be described with reference to FIGS. 8 to 11.

In this game, a user operates a player object in a first game space and a second game space displayed on the display 12, for a predetermined purpose. The player object of the present embodiment simulates the form of a person.

Figure 8:
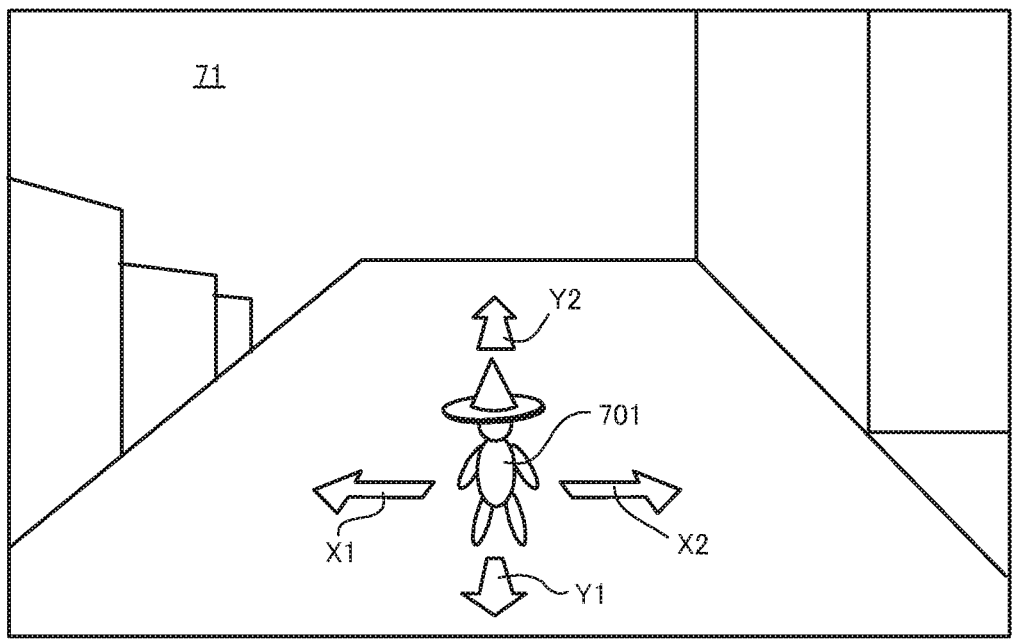
FIG. 8 is a diagram showing an overview of a first game space displayed on a display.

In this game, a virtual camera is set, and the region imaged by the virtual camera is displayed on the display 12. FIG. 8 shows a screen displayed on a display, and the first game space 71 displayed on this screen imitates a three-dimensional space. Also, the player object 701 can perform three-dimensional movement in the first game space 71. That is, the player object 701 can move not only in directions perpendicular to the imaging direction of the virtual camera (the directions of arrows X1 and X2 in FIG. 8), but also toward the near side and toward the far side in the imaging direction (the direction of arrows Y1 and Y2 in FIG. 8) in the first game space 71. Also, in the first game space 71, the player object 701 is displayed in a three-dimensional mode. That is, the player object 701 can be displayed in a mode having depth in accordance with the first game space 71 imitating a three-dimensional space, and for example, the player object 701 can be rendered using polygons. Hereinafter, this kind of display mode of the player object will be referred to as a first display mode.

Figure 9:
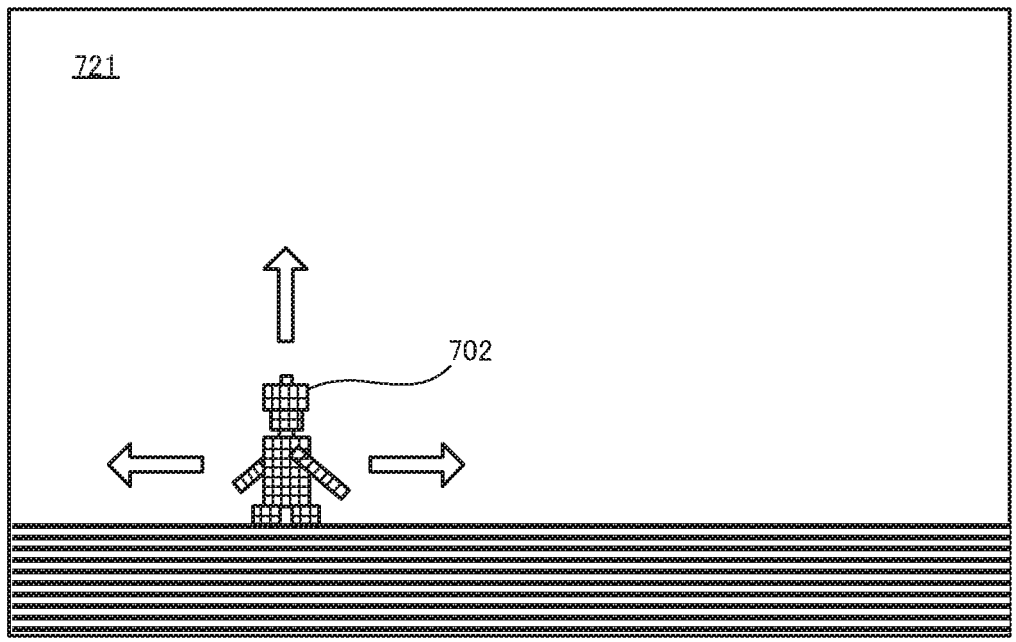
FIG. 9 is a diagram showing an overview of a type T1 of a second game space displayed on a display.
Figure 10:
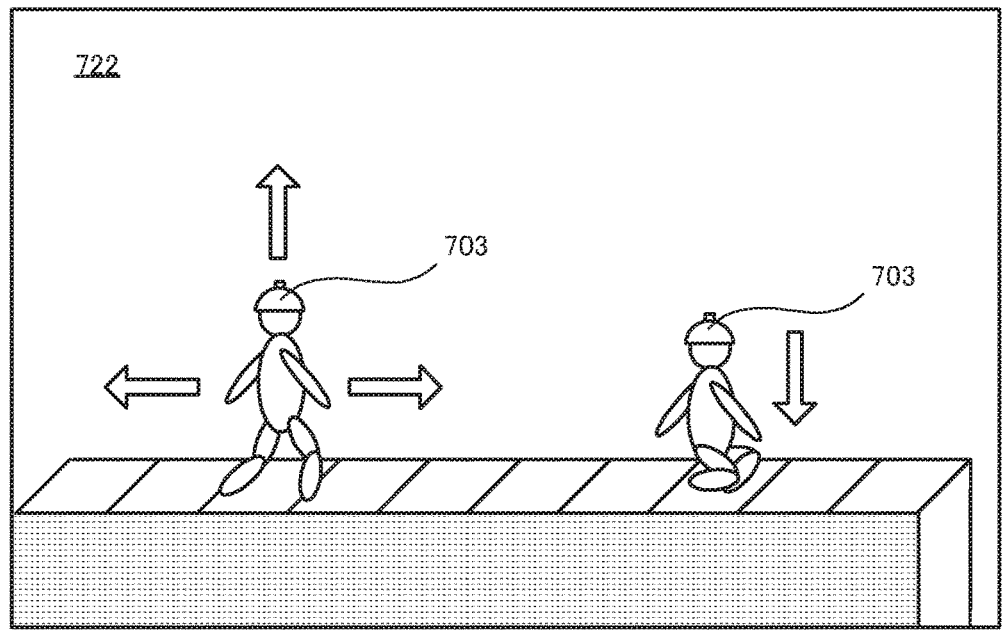
FIG. 10 is a diagram showing an overview of a type T2 of the second game space displayed on the display.

On the other hand, in the present embodiment, there are multiple game courses that are set as second game spaces, and as will be described later, the user can select these game courses. Although an example of this is shown in FIGS. 9 and 10, the second game space is not limited to these two types. FIG. 9 is an example of a screen displaying the second game space 721. The second game space 721 imitates a two-dimensional space, and a player object 702 can perform two-dimensional movement in the second game space 721. That is, the player object 702 can move only in directions perpendicular to the imaging direction of the virtual camera (the directions of the arrows in FIG. 9) in the second game space 721. Also, in the second game space 721, the player object 702 is displayed in a two-dimensional mode using dots or the like. That is, the player object 702 is displayed in a mode with no depth in accordance with the second game space 721, which imitates a two-dimensional space. Hereinafter, the second game space 721 imitating this two-dimensional space will be referred to as type T1.

Next, the second game space shown in FIG. 10 will be described. FIG. 10 is an example of a screen displaying a second game space 722. As shown in FIG. 10, the second game space 722 imitates a three-dimensional space, but a player object 703 can only perform two-dimensional movement in the second game space 722. That is, the second game space 722 is displayed so as to have depth, but the player object 703 can move only in directions perpendicular to the imaging direction of the virtual camera (the directions of the arrows in FIG. 10) in the second game space 722. That is, the player object 703 cannot move toward the near side or toward the far side in the imaging direction. Also, in the second game space 722, the player object 703 is displayed in a three-dimensional mode. That is, the player object 703 is displayed in a mode having depth in accordance with the second game space 722, which imitates a three-dimensional space. Hereinafter, the second game space 722 imitating this three-dimensional space will be referred to as "type T2". Also, the types of the second game spaces 721 and 722 such as the type T1 and the type T2 will be referred to as "game space types". Also, any game space type is set for the above-described multiple game courses. Note that in the second game spaces 721 and 722, operation for movement of the player objects 702 and 703 can also be performed without using a virtual camera. That is, as long as operation can be performed such that the player objects 702 and 703 can move along the surface direction of the display 12, the virtual camera is not necessarily needed.

As described above, a game space imitating a two-dimensional space and a game space imitating a three-dimensional space are set as the second game spaces 721 and 722, and the display modes of the player objects 702 and 703 are set accordingly. However, the player objects 702 and 703 are both set such that they can perform only two-dimensional movement, that is, they can move only in directions perpendicular to the imaging direction of the virtual camera (or in directions along the surface direction of the display 12). Accordingly, hereinafter, the display mode of the player objects displayed in the second game spaces 721 and 722 will be referred to as "third display mode". Note that the second display mode will be described later. Also, in order to distinguish the player objects displayed in the game spaces 71, 721, and 722, the reference numerals of the player objects displayed in the first game space 71, the type T1 (721) of the second game space, and the type T2 (722) of the second game space are displayed as 701, 702, and 703 respectively.

Figure 11:
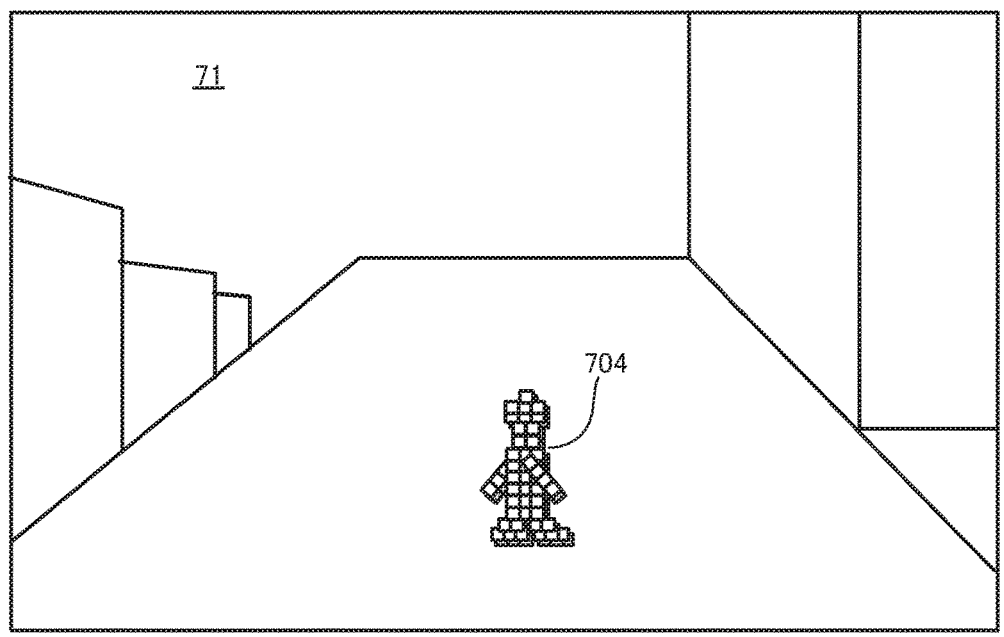
FIG. 11 is a diagram showing a state in which a player object in a second display mode is displayed in the first game space of FIG. 8.
Figure 12:
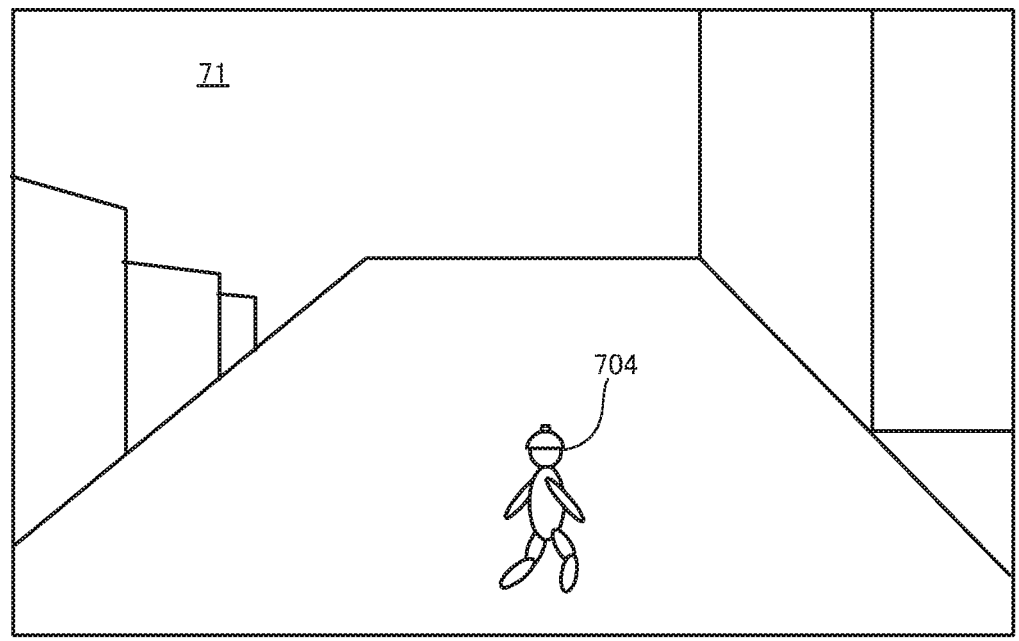
FIG. 12 is a diagram showing a state in which a player object in the second display mode is displayed in the first game space of FIG. 9.

Also, in the present embodiment, when a game course in which any type of second game space has been set is selected during play in the first game space 71, the player object 701 changes to the second display mode before the screen of the game transitions from the first game space 71 to the second game space 721 or 722. Then, after the player object has changed to the second display mode, the space displayed on the display 12 transitions to the second game space 721 or 722. For example, when a game course C1 in which a second game space of the type T1 (721) has been set is selected, as shown in FIG. 11, in the first game space 71, the player object changes from the first display mode 701 to the second display mode 704. The second display mode 704 is reminiscent of the third display mode 702 of the type T1, and is a display mode in which small cubes are combined instead of the dot expression of the third display mode 702. Upon seeing this second display mode 704, the user can prepare for the second game space 721, which will be displayed next. Also, after the screen shown in FIG. 11 is displayed, on the display 12, the second game space 721 shown in FIG. 9 is displayed along with the player object 702 in the third display mode, for example, after a transitional display such as blackout. Note that the second display modes are set for each type of second game space, and when a game course C2 in which the second game space 722 of the type T2 shown in FIG. 10 has been set is selected, for example, as shown in FIG. 12, the player object 704 is displayed in a second display mode different from that of FIG. 11.

3. Functional Configuration of Game System

Figure 13:
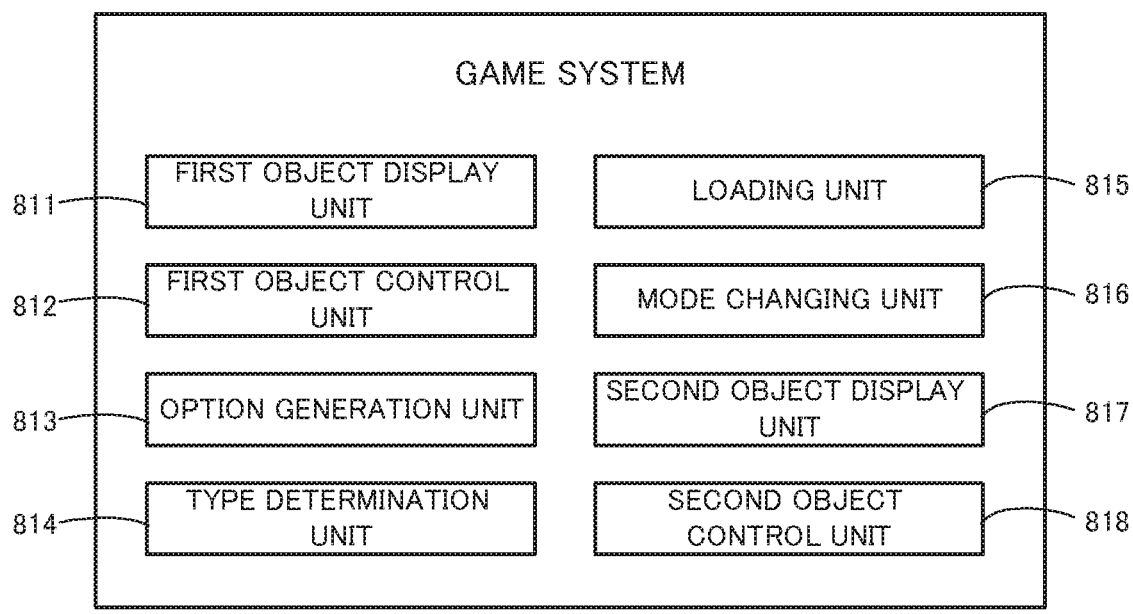
FIG. 13 is an example of a functional configuration of a game system according to an embodiment of the present invention.

Next, the functional configuration (software configuration) of the game system configured as described above will be described. FIG. 13 is an example of a functional configuration of a game system according to the present embodiment. A processor 81 of the game system expands information processing programs stored in a flash memory 84 or an external storage medium mounted in a slot 23, to a DRAM 85. Then, the processor controls the functional constituent elements by interpreting and executing the information processing program that was expanded to the DRAM 85. Accordingly, the game system according to the present embodiment functions as a computer including a first object display unit 811, a first object control unit 812, an option generation unit 813, a type determination unit 814, a loading unit 815, a mode changing unit 816, a second object display unit 817, and a second object control unit 818.

When the first game space 71 is displayed on the display 12, the first object display unit 811 controls the display mode for displaying the player object 701 in the first display mode, as shown in FIG. 8. Then, the first object control unit 812 performs three-dimensional control for causing the player object 701 displayed in the first display mode to perform three-dimensional movement in the first game space 71. That is, as described above, the player object 70 can be moved in directions perpendicular to the imaging direction of the virtual camera, and toward the near side and toward the far side in the imaging direction, as indicated by the arrow in FIG. 8.

At this time, the first object control unit 812 allows operation of the player object 701 using either of the analog sticks 32 and 52. For example, when the analog stick 32 or 52 is tilted in the left-right direction, the player object 701 moves in the left-right direction along directions perpendicular to the imaging direction, that is, along the surface direction of the display 12 in the first game space 71. Also, accompanying the operation of the movement of the player object 701, in the display 12, control for scrolling the first game space 71 in the left-right direction is also performed. Also, when the analog stick 32 or 52 is tilted upward, the player object 701 moves toward the far side in the imaging direction of the virtual camera in the first game space 71, and when the analog stick 32 or 52 is tilted downward, the player object 701 moves toward the near side in the imaging direction of the virtual camera. Also, accompanying the operation for movement toward the far side or toward the near side of the player object 701, in the display 12, control for scrolling the player object 701 or the first game space 71 toward the near side or toward the far side is also performed in some cases. Note that the operation of the player object 701 in the first game space 71 is not limited to that described above, and various types of operation other than movement can be performed using operation input means (analog stick, various operation buttons, etc.) provided on the controllers 3 and 4.

Figure 14:
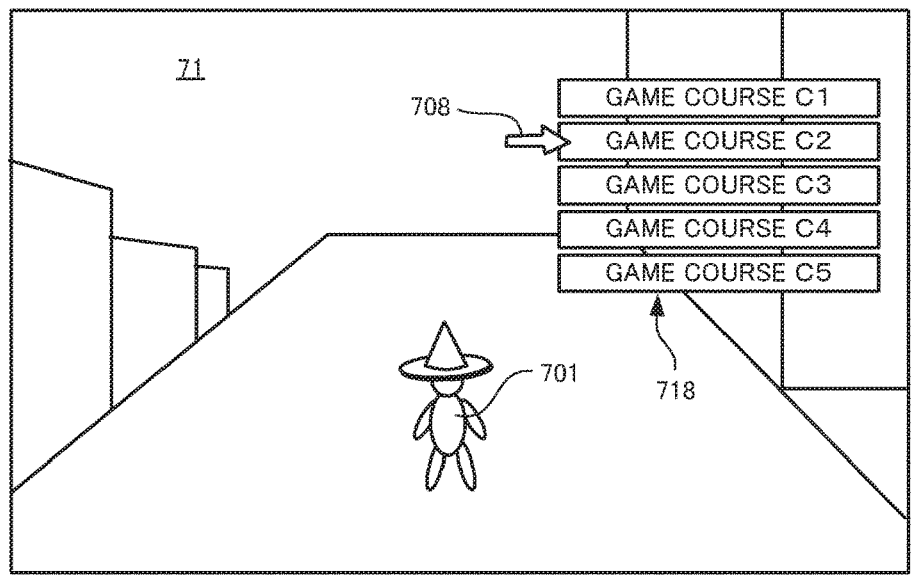
FIG. 14 shows an example of a screen of the first game space in which a game space type list is displayed.

When the first game space 71 is displayed, upon performing a predetermined operation, the option generation unit 813 displays selectable game courses on the screen. Then, when a predetermined operation is performed, or for example, when any button is pressed, a game course list 718 in which multiple game courses are shown is displayed. As described above, any type of game space is set for each game course, and in the example of FIG. 14, the above-described types T1 and T2 are set for the game courses C1 and C2, but this is an example, and the number of game courses and the types to be set can be changed as needed. Then, for example, when the user moves a pointer 708 displayed on the screen using the analog stick 32 or 52 and presses down the analog stick 32 or 52 over any game course, selection of the game course is completed. Note that the method for selecting the game course is not particularly limited, and need only be selected using any operation input equipped in the game system.

The type determination unit 814 determines which game space type was selected. That is, the game space type that has been set for the selected game course is determined. Here, the second game space that was set for the selected game course will be referred to as the "selected game space". The loading unit 815 loads data for the selected game space (later-described second game space data 853) from the flash memory 84 or the external storage medium to the DRAM 85 based on the determination of the type determination unit 814. In this manner, when the data for the selected game space is loaded to the DRAM 85, the game on the game course in which the second game space 721 or 722 has been set can be started.

The mode changing unit 816 changes the player object 701 displayed in the first display mode to the second display mode according to the type determined by the type determination unit 814. Note that the player object 704 in the second display mode is a display mode that is temporary until a transition is made from the first game space 71 to the second game space 721 or 722.

After the screen of the display 12 transitions to the second game space 721 or 722, the second object display unit 817 controls the display mode for displaying the player object 702 or 703 in the third display mode. Then, the second object control unit 818 performs two-dimensional control for causing the player object 702 or 703 displayed in the third display mode to perform two-dimensional movement in the second game space 721 or 722. That is, as described above, the second object control unit 818 performs control for causing the player object 702 or 703 to move in directions perpendicular to the imaging direction of the virtual camera (or in directions along the surface direction of the display 12).

At this time, the second object control unit 818 allows operation of the player object 702 or 703 using the analog stick 32 or 52 or the four operation buttons 33 to 36 of the left controller 3. However, depending on the type of the game, it is more appropriate to use the operation buttons 33 to 36 in some cases. In the case of using the operation buttons 33 to 36, for example, when the right directional button 33 or the left directional button 36 is pressed, the player object 701 moves in the left-right direction along the surface direction of the display 12 in the second game space 721 or 722. Also, accompanying the movement in the left-right direction of the player object 701, control for scrolling the second game space 721 or 722 in the left-right direction is also performed in the display 12. Furthermore, for example, in the second game space 721 or 722, if a climbable object such as a ladder or ivy is displayed at the position of the player object 702 or 703, when the up direction button 35 is pressed down, the player object 702 or 703 moves so as to climb the object. However, if such an object is not displayed, nothing happens when the up direction button 35 is pressed down. On the other hand, when the down direction button 34 is pressed down, for example, a squatting action is performed as with the player object 703 on the right side of FIG. 10. Otherwise, in the second game space 721 or 722, the player object 702 or 703 can operate using an operation method different from that of the first game space 71. For example, when the B button 54 of the right controller 4 is pressed down together with the right direction button 33 or the left direction button 36, the player object 702 or 703 can be moved while dashing in the left-right direction. Note that the operation of the player object 702 or 703 in the second game space 721 or 722 is not limited to that described above, and various operations other than movement can be performed using the operation input means provided on the controllers 3 and 4.

Figure 15:
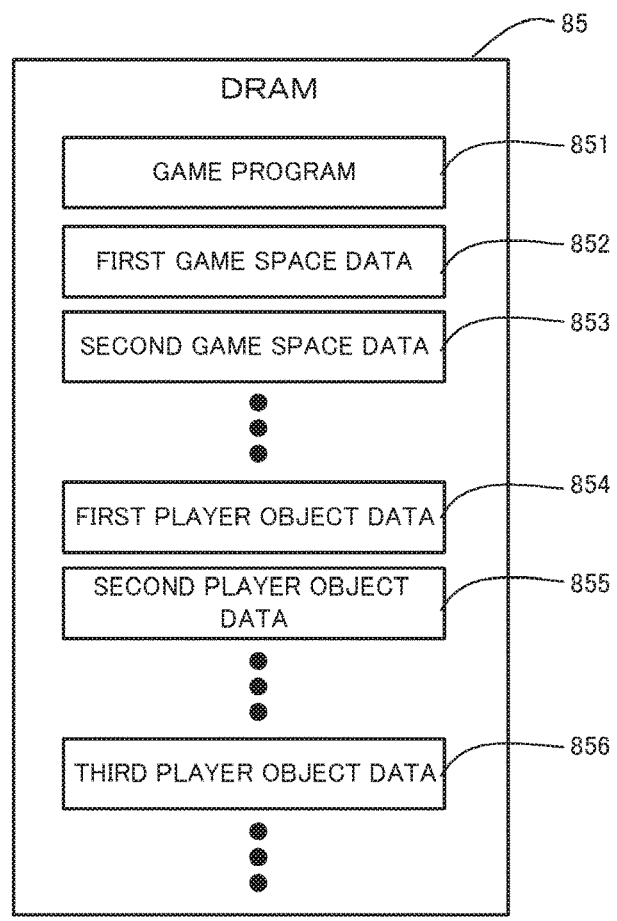
FIG. 15 shows an example of data stored in a DRAM.

Next, an example of data stored in the DRAM 85 will be shown in FIG. 15. As shown in FIG. 15, a game program 851, first game space data 852 relating to the first game space 71, second game space data 853 relating to the multiple second game spaces 721 and 722, first player object data 854 relating to the player object 701 in the first display mode, multiple pieces of second player object data 855 relating to the player objects 702 and 703 in the third display mode, and multiple pieces of third player object data 856 relating to the player object 704 in the second display mode are stored in the DRAM 85.

The game program 851 is a program for performing the game of the present embodiment, and is stored in advance in a flash memory 84 or an external storage medium mounted in the slot 23. The game program 851 is loaded to the DRAM 85 when the game is started.

Among data other than that, the second game space data 853 and the second player object data are loaded to the DRAM 85 after the determination performed by the type determination unit 814, as described above.

In addition, data relating to objects that are needed to progress in the game is also loaded to the DRAM 85 and executed as needed, although this is not shown in the drawings. Objects in this context mean various elements included in the game, such as characters such as people, animals, and monsters that appear in the game, tools and weapons held by the characters, structures such as buildings, and natural features such as mountains, lakes, and rocks. Also, in addition to objects having concrete forms, events performed during the game (e.g., fighting scenes and demonstrations) are also objects.

4. Example of Game Processing

Figure 16:
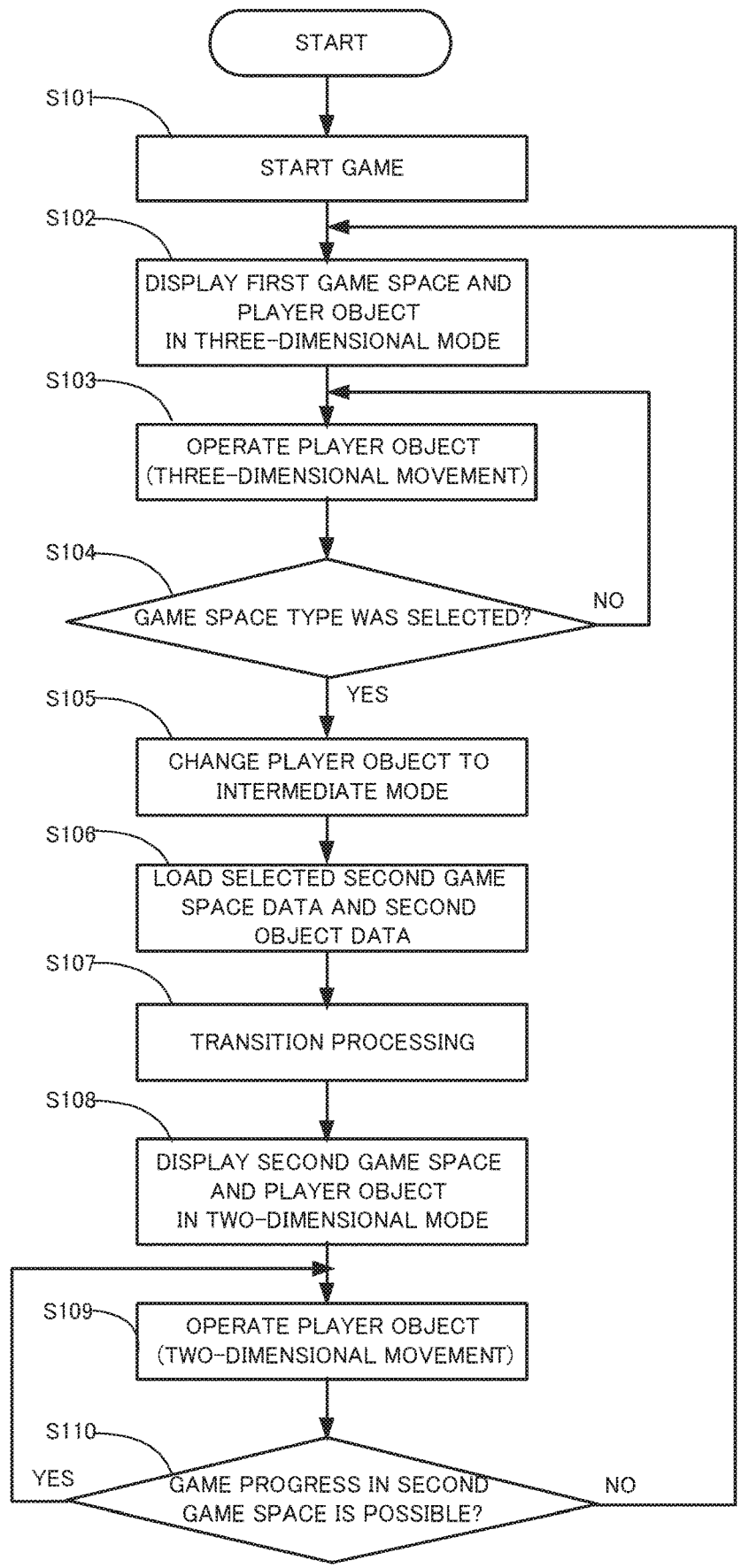
FIG. 16 is a flowchart showing an example of game processing.

Next, an example of game processing will be described with reference to FIG. 16. FIG. 16 is a flowchart indicating an example of game processing. First, when the game program 851 is loaded to the DRAM 85 and the game is started (step S101), as shown in FIG. 8, the player object 701 in the first display mode is displayed along with the first game space 71 on the display 12 (step S102). In this state, the user operates one of the analog sticks 32 and 52 to cause the player object 701 to perform three-dimensional movement in the first game space 71 (step S103). In addition, when an operation that is necessary in the game is performed using the controller 3 or 4, game processing is performed accordingly.

Then, after the game space type list is displayed on the screen through a predetermined operation, when the user selects a game space type (YES in step S104), the game space type is determined by the type determination unit 814. Then, as shown in FIG. 11 or 12, the player object is changed from the first display mode 701 to the second display mode 704, according to the determination result (step S105). Thereafter, after the start of the loading of the data, which will be described later (step S106), transition processing, such as blackout of the screen, is performed (step S107).

After the determination performed by the above-described type determination unit, the selected second game space data 853 and the second player object data 855 are loaded to the DRAM 85 (step S106). The loading of these pieces of data 853 and 855 is internal processing, and therefore although it is also possible to perform loading at the same time as, before, or after the changing of the player object to the second display mode, loading is naturally completed before the above-described transition processing ends, that is, before the blackout ends.

When the loading of the second game space data 853 and the second player object data 855 is complete, after the above-described blackout, the player object 702 or 703 in the third display mode is displayed on the display 12 along with the second game space (step S108). In this state, the user operates the operation buttons 33 to 36 to cause the player object 702 or 703 to perform two-dimensional movement in the second game space 721 or 722 (step S109). In addition, when an operation that is necessary in the game is performed using the controller 3 or 4, game processing is performed accordingly.

Then, in the second game space 721 or 722, when a predetermined goal is attained and the game is cleared, or when a state is entered in which it is not possible to progress through the game, such as when the player object dies or retires (NO in step S110), transition processing such as blackout of the screen is performed, and thereafter the first game space 71 and the player object 701 in the first display mode are displayed (step S102). Accordingly, the user resumes the game in the first game space 71.

5. Characteristics

According to the game system of the present embodiment, the following effects can be obtained.

(1) When a transition is to be made from the first game space 71 in which three-dimensional control is performed on the player object to the second game space 721 or 722 in which two-dimensional control is performed on the player object, after the player object is changed from the first display mode to the second display mode, which is reminiscent of the third display mode, in the first game space 71 according to the type of the selected second game space, the object is displayed in the third display mode in the second game space. For this reason, when a transition is made from the first game space 71 to the second game space 721 or 722, it is possible to reduce a user's feeling that something is wrong due to the player object suddenly changing from the first display mode to the third display mode.

(2) The second game space data 853 and the second player object data 855 can be loaded using the period of time from when the player object changes from the first display mode to the second display mode to when the blackout is complete thereafter. That is, since time for showing the change in the display mode of the player object to the user is provided in the period up to when the display of the display 12 transitions from the first game space 71 to the second game space 721 or 722, it is possible to reduce the amount of time during which the user experiences the loading of the data. Note that in the present embodiment, if the second game space 722 of the type T2 is selected, as shown in FIGS. 10 and 12, the second display mode and the third display mode of the player object are the same. For this reason, in this case, when a transition is made to the second game space 722, it is not necessary to load the player object 704 in the third display mode. That is, the load time of the player object 704 in the third display mode can be eliminated.

(3) In the present embodiment, the method for operating the player object 701 in the first game space 71 and the method for operating the player object 702 or 703 in the second game space 721 or 722 are different from each other. That is, in the first game space 71, the player object 701 is moved using the analog stick 32 or 52, but in the second game space 721 or 722, the operation buttons 33 to 36 are more appropriate for the game than the analog sticks 32 and 52 in some cases. In the present embodiment, as described above, the player object 704 in the second display mode, which is reminiscent of the third display mode, is displayed while a transition is made from the first game space 71 to the second game space 721 or 722, and therefore by viewing the player object 704 in the second display mode, the user can perform preparation for playing in the second game space 721 or 722, such as switching the controllers 3 and 4. That is, if the optimal input means for operation for playing in the first game space 71 and the optimal input means for operation for playing in the second game space 721 or 722 are different from each other, preparation can be performed.

6. Modified Examples

Although an embodiment of the present invention was described above, the present invention is not limited to the above-described embodiment, and various modifications are possible without departing from the gist of the present invention. For example, the following modifications are possible. Also, the following modified examples can be combined as appropriate.

Figure 17:
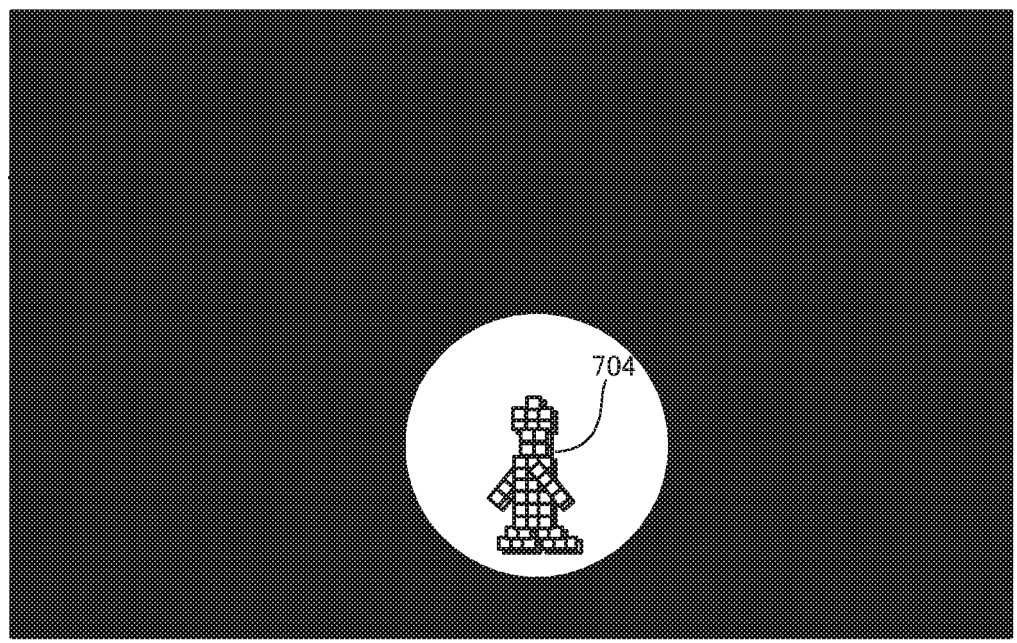
FIG. 17 is a diagram showing another example of transition processing.

(1) In the above-described embodiment, after the player object changes from the first display mode to the second display mode, transition processing through blackout is performed, and thereafter the player object in the third display mode is displayed along with the second game space, but the transition processing is not limited to blackout. For example, as shown in FIG. 17, processing such as causing a black portion to perform a wipe-in in a circular shape is performed on the player object in the second display mode, and after the entire screen is blacked out, the second game space 721 or 722 and the player object 702 or 703 can be displayed. Accordingly, the changed player object 704 in the second display mode can be emphasized, and the user can be shown, in an easily understandable manner, that the game space is transitioning. Note that this kind of processing for emphasizing the player object accompanying the transition of the screen is not limited to wiping in, and various modes are possible. Also, an emphasis screen generation unit can be added to the game program as a functional configuration for performing this kind of processing.

In addition, the transition processing can be set as appropriate. Alternatively, after the player object 704 in the second display mode has been displayed for a predetermined amount of time, the second game space 721 or 722 and the player object 702 or 703 can be displayed by switching the screen from the first game space 71 to the second game space 721 or 722 without performing blackout or the transition processing shown in FIG. 17.

The same applies to the transition from the second game space 721 or 722 to the first game space 71, and various types of transition processing described above can be performed. Alternatively, it is also possible to perform switching of the screen from the second game space 721 or 722 to the first game space 71 without performing transition processing.

(2) The first display mode, the second display mode, and the third display mode, which are display modes of the player object indicated in the above-described embodiment, are examples, and various modes are possible. For example, the first display mode according to the present invention need not necessarily be a display mode that corresponds to a three-dimensional space such as the first game space, and may also be two-dimensional display or a display mode similar thereto. Also, although it is sufficient that the third display mode according to the present invention is two-dimensional display or three-dimensional display in accordance with the game space type as in the above-described embodiment, it is not necessary to match the type of the game space, and it is sufficient that the third display mode is different from at least the first display mode. Note that three-dimensional display is display in which at least the depth is visible, and two-dimensional display is display in which depth is not visible and the player object can be recognized only in a plane. Also, being similar to two-dimensional display can be, for example, display in which the depth is very small, the display appearing to be two-dimensional display at first glance.

Furthermore, in the above-described embodiment, the second display mode according to the present invention is display in which dots are combined when transitioning to the second game space 721 of the type T1, but there is no limitation to this, and various display modes relating to the third display mode are possible. "Relating to the third display mode" can be, for example, a display mode that is reminiscent of the third display mode, and if the third display mode is two-dimensional display, it is possible to use a two-dimensional mode or a three-dimensional mode with a small depth. Alternatively, even if the third display mode is three-dimensional display, for example, if the second game spaces 721 and 722 and the third display mode are game spaces and the like that recreate a game of an older type, it is also possible to use a display mode in which the number of pixels accordingly looks smaller, and this kind of display mode can also be referred to as "relating to the third display mode". Also, the second display mode and the third display mode can be made the same, and this can also be referred to as "relating to the third display mode".

Then, due to the second display mode and the third display mode relating to each other, when a transition is to be made from the first game space 71 to the second game space 721 or 722, it is possible to cause the user to recognize that play will continue with the player object remaining as the same character (for example, the same person). Furthermore, it is possible to also cause the user to recognize that the playing in the first game space 71 and the playing in the second game space 721 or 722 are events that are performed collinearly in terms of world view.

(3) In the above-described embodiment, the operation of the player object in the first game space 71 and the operation of the player object in the second game space 721 or 722 are different from each other, depending on the type of the game. That is, the second object control unit 818 allows operation of the player object 702 or 703 using an operation method different from that of the first object control unit 812 in some cases, but this includes, for example, a case in which an operation that is possible in one game space is not possible in another game space, in addition to using different operation input means when performing the same operation. For example, in addition to dashing using the above-described B button, the method for jumping and the like can be made different. Also, the second object control unit 818 can have some operation methods that are the same as those of the first object control unit 812, or all of the operation methods can be made the same.

(4) The method for operating the player object 702 or 703 in the second game space 721 or 722 can also be varied depending on the game space type. For example, the operation input means arranged in the controllers 3 and 4, such as the analog sticks and the operation buttons, can be different from each other. This can similarly apply to the matter disclosed in (3) above.

(5) When a transition is made from the second game space 721 or 722 to the first game space 71, in the second game space 721 or 722, after the player object 702 or 703 is changed to the second display mode 704, the player object can also be displayed in the first display mode together with the transition to the first game space 71. The second display mode in this case is a display mode relating to the first display mode, and this can be similarly applied to the matter disclosed in (2) above.

(6) The player object is not limited to a person, and need only be a movable character such as an animal, a monster, or a moving object (an automobile, or the like).

(7) In the above-described embodiment, the game system corresponding to the information processing apparatus of the present invention has the display 12, but there is no limitation to this. That is, the information processing apparatus according to the present invention need not include the display, and can be connected to a display apparatus including an external display, and the above-described screens need only be displayed on that display.

(8) The information processing program, the information processing apparatus, and the information processing method of the present invention can be applied also to play for multiple people via a network such as a LAN or the Internet, which is connected to with a wire or wirelessly.

DESCRIPTION OF REFERENCE NUMERALS

1 Game system (information processing apparatus)
12 Display (display unit)
71 First game space
721, 722 Second game space
701 Player object in first display mode
702, 703 Player object in third display mode
704 Player object in second display mode
85 DRAM (memory)
811 First object display unit
812 First object control unit
813 Option generation unit
814 Type determination unit
815 Loading unit
816 Mode changing unit
817 Second object display unit
818 Second object control unit

What is claimed is:

1. A non-transitory storage medium storing therein a program that is readable by a computer of an information processing apparatus, the program being configured to cause the computer to:
   display a player object in a first display mode in a first game space;
   perform three-dimensional control for causing the player object displayed in the first display mode to perform three-dimensional movement in the first game space based on an operation performed by a user;
   generate an image for allowing the user to, from among options respectively corresponding to one of a plurality of second game spaces, select one of the second game spaces as a selected game space;
   determine a game space type based on the selected game space, game space types being respectively set for the plurality of second game spaces;
   change the player object displayed in the first display mode to the player object displayed in a second display mode corresponding to the determined game space type in the first game space after determination of the game space type;
   load data for the selected game space to a memory of the information processing apparatus;
   display the player object in a third display mode in the selected game space after loading of the data for the selected game space is complete; and
   perform two-dimensional control for causing the player object displayed in the third display mode to perform two-dimensional movement in the selected game space based on an operation performed by the user,
   wherein the program is configured to cause the computer to use, as the second display mode, a display mode in which the player object is displayed in three-dimensional mode of the player object displayed in the third display mode, or use the third display mode as the second display mode.

2. The storage medium according to claim 1, wherein the program is further configured to cause the computer to allow operation of the player object in the second game space using an operation method different from that in the first game space.

3. The storage medium according to claim 2, wherein the program is further configured to cause the computer to allow operation of the player object in the second game space using an operation input method different from that in the first game space.

4. The storage medium according to claim 1, wherein the program is further configured to cause the computer to allow operation of the player object in the second game space using an operation method respectively set for the game space type of the selected game space.

5. The storage medium according to claim 4, wherein the program is further configured to cause the computer to allow operation of the player object in the second game space using an operation input method respectively set for the game space type of the selected game space.

6. The storage medium according to claim 1, wherein the program is further configured to cause the computer to use a three-dimensional display mode as the first display mode.

7. The storage medium according to claim 1, wherein the program is further configured to cause the computer to display the player object in the third display mode in the selected game space expressed as a two-dimensional space.

8. The storage medium according to claim 1, configured to further cause the computer to generate an image in which the player object is visually emphasized relative to another portion, after the player object displayed in the first display mode is changed to the player object displayed in the second display mode.

9. The storage medium according to claim 1, wherein
   if a condition for loading the first game space is satisfied when the two-dimensional control is being performed in the second game space,
   the program is configured to cause the computer to perform loading of the data for the first game space, and
   the program is configured to cause the computer to change the player object displayed in the third display mode to the player object displayed in the first display mode in the second game space before the three-dimensional control is started in the first game space.

10. An information processing apparatus comprising:
    a display;
    at least one processor;
    at least one volatile memory;
    at least one storage medium; and
    a program stored in the storage medium;
    wherein the program is configured to cause the processor to:
      display a player object in a first display mode in a first game space displayed on the display;
      perform three-dimensional control for causing the player object displayed in the first display mode to perform three-dimensional movement in the first game space based on an operation performed by a user;
      generate an image for allowing the user to, from among options respectively corresponding to a plurality of second game spaces, select one of the second game spaces as a selected game space;

determine a game space type based on the selected game space, game space types respectively being set for the plurality of second game spaces;

change the player object displayed in the first display mode to the player object displayed in a second display mode corresponding to the determined game space type in the first game space after determination of the game space type;

load data for the selected game space to the memory;

display the player object in a third display mode relating to the second display mode in the selected game space displayed on the display after loading of the data for the selected game space is complete; and perform two-dimensional control for causing the player object displayed in the third display mode to perform two-dimensional movement in the selected game space based on an operation performed by the user.

11. An information processing apparatus to be connected to a display apparatus including a display, the information processing apparatus comprising:

at least one volatile memory;
at least one processor;
at least one storage medium; and
a program stored in the storage medium;
wherein the program is configured to cause the processor to:

display a player object in a first display mode in a first game space displayed on the display;

perform three-dimensional control for causing the player object displayed in the first display mode to perform three-dimensional movement in the first game space based on an operation performed by a user;

generate an image for allowing the user to, from among options respectively corresponding to a plurality of second game spaces, select one of the second game spaces as a selected game space;

determine a game space type based on the selected game space, game space types being respectively set for the plurality of second game spaces;

change the player object displayed in the first display mode to the player object displayed in a second display mode corresponding to the determined game space type in the first game space after determination of the game space type;

load data for the selected game space to the memory;

display the player object in a third display mode relating to the second display mode in the selected game space displayed on the display after loading of the data for the selected game space is complete; and perform two-dimensional control for causing the player object displayed in the third display mode to perform two-dimensional movement in the selected game space based on an operation performed by the user.

12. An information processing method to be executed by a computer of an information processing apparatus, the information processing method comprising:

displaying a player object in a first display mode in a first game space;

performing three-dimensional control for causing the player object displayed in the first display mode to perform three-dimensional movement in the first game space based on an operation performed by a user;

generating an image for allowing the user to, from among options respectively corresponding to a plurality of second game spaces, select one of the second game spaces as a selected game space;

determining a game space type based on the selected game space, game space types being respectively set for the plurality of second game spaces;

changing the player object displayed in the first display mode to the player object displayed in a second display mode corresponding to the determined game space type in the first game space after determination of the game space type;

loading data for the selected game space to a memory of the information processing apparatus;

displaying the player object in a third display mode relating to the second display mode in the selected game space after loading of the data for the selected game space is complete; and performing two-dimensional control for causing the player object displayed in the third display mode to perform two-dimensional movement in the selected game space based on an operation performed by the user.

* * * * *